United States Patent
Peng

(10) Patent No.: US 6,882,775 B1
(45) Date of Patent: *Apr. 19, 2005

(54) APPARATUS AND METHOD FOR MULTIPLEXING AND DE-MULTIPLEXING OPTICAL SIGNALS EMPLOYING A ANAMORPHIC BEAMS AND DIFFRACTION GRATINGS

(75) Inventor: Song Peng, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 10/337,756

(22) Filed: Jan. 7, 2003

Related U.S. Application Data

(60) Provisional application No. 60/347,077, filed on Jan. 8, 2002.

(51) Int. Cl.[7] .................................................. G02B 6/34
(52) U.S. Cl. ............................. 385/36; 385/37; 398/86; 398/87
(58) Field of Search ..................................... 385/36–37

(56) References Cited

U.S. PATENT DOCUMENTS

| | | | |
|---|---|---|---|
| 6,339,504 B1 * | 1/2002 | Oliva | 359/641 |
| 6,441,934 B1 * | 8/2002 | Boord et al. | 398/87 |
| 6,728,488 B1 * | 4/2004 | Peng et al. | 398/86 |
| 2002/0159112 A1 * | 10/2002 | Coppeta et al. | 359/110 |
| 2003/0002038 A1 * | 1/2003 | Mawatari | 365/300 |

* cited by examiner

Primary Examiner—John D. Lee
Assistant Examiner—Eric Wong
(74) Attorney, Agent, or Firm—Moser, Patterson & Sheridan, L.L.P.

(57) ABSTRACT

An optical multiplexing/demultiplexing apparatus includes: an optical fiber; a collimator optically coupled to the optical fiber; at least one anamorphic pair of prisms optically coupled to the collimator at a side opposite to the optical fiber; a diffraction grating optically coupled to the at least one anamorphic pair of prisms at a side opposite to the collimator; a focusing lens optically coupled to the at least one anamorphic pair of prisms; and a plurality of optical devices optically coupled to the focusing lens at a side opposite to the at least one anamorphic pair of prisms. The at least one anamorphic pair of prisms permits the beam incident upon the diffraction grating to be relatively narrow in a dimension perpendicular to the dispersive direction of the grating so that the grating can produce high spectral resolution while preserving compact system size and simplicity.

10 Claims, 3 Drawing Sheets

US 6,882,775 B1

APPARATUS AND METHOD FOR MULTIPLEXING AND DE-MULTIPLEXING OPTICAL SIGNALS EMPLOYING A ANAMORPHIC BEAMS AND DIFFRACTION GRATINGS

CROSS-REFERENCE TO RELATED APPLICATION

This application is claiming under 35 USC 119(e) the benefit of provisional patent application Ser. No. 60/347,077 filed on Jan. 8, 2002.

FIELD OF THE INVENTION

The present invention relates to multiplexers and de-multiplexers for wavelength division multiplexed optical communications systems. More particularly, the present invention relates to multiplexers and de-multiplexers that utilize either reflection-type or transmission type diffraction gratings to either separate or combine optical channels carried in such optical communications systems.

BACKGROUND OF THE INVENTION

In a wavelength division multiplexing optical communications system, information is carried by multiple channels each with a distinct wavelength range. It is often necessary to separate, combine, selectively attenuate or amplify each wavelength channel. In order to perform these functions one usually needs to separate the wavelength channels from one another. In this specification, these individual information-carrying lights of a wavelength division multiplexing optical fiber, optical line or optical system are referred to as either "signals" or "channels." The totality of multiple combined signals, wherein each signal is of a different wavelength range, is herein referred to as a "composite optical signal." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1$–$\lambda_n$.

A de-multiplexer is an apparatus that receives a composite optical signal comprising a plurality of wavelengths or channels and separates the channels among a plurality of respective outputs. A multiplexer is an apparatus that receives a plurality of wavelengths or channels from separate respective inputs and combines them into a single composite optical signal directed to a single output. Because light paths are generally reversible through most optical components and apparatuses, such separation or combination can generally be performed by a single apparatus, depending upon the direction of light through the apparatus. Such an apparatus that can be utilized as either a multiplexer or a de-multiplexer is herein termed a multiplexer/de-multiplexer (MUX/DEMUX).

A diffraction grating is an effective wavelength dispersive component that can be used to either separate or combine wavelength channels. It is known that the resolving power of a diffraction grating not only depends upon the angular dispersion of the grating, but also upon the size of the optical beam incident upon the grating. The resolving power of a grating can be written as:

$$\frac{\lambda}{\Delta\lambda} = mN$$

where $\lambda$ is the center wavelength, $\Delta\lambda$ is the minimum wavelength difference that can be resolved, m is the diffraction order and N is the number of "grooves" illuminated by the optical beam. Apparently, because N is proportional to the width of the incident optical beam, the resolving power is linearly proportional to the width of the incident beam.

It is also necessary for the divergence of an optical beam incident upon the grating to be smaller then the angular dispersion provided by the grating to effectively separate two adjacent wavelength channels. If a lens is used to focus the diffracted beams to different respective spots, the resolving power expression also means that the diffracted beam of a wavelength channel must be focused into a spot that is smaller than the spatial separation of two adjacent wavelength channels at the focal plane.

Fiber collimators are often used to collimate divergent optical beams emerging from optical fibers. Because an optical beam emitted from a single-mode fiber is circular, the collimated beam comprises a round cross section. The diameter of the collimated beam is proportional to the focal length of the collimating lens. To achieve large beam size so as to illuminate an adequate number of grating grooves, one can choose large focal length collimating lenses. However, if this is done, subsequent large optical components must be provided to handle the resulting large beams. This usually creates an increase in system complexity and overall size.

It is realized by the inventors of the present invention that, for most fiber optics applications, the incident beam only needs to have a large width in the dispersive direction of the grating—that is, perpendicular to the grating "grooves" or other diffraction-causing pattern on the grating. This means that an anamorphic optical beam with an elliptical cross section can be effectively utilized to achieve high spectral resolution while preserving compact system size and simplicity. There is therefore a need, in the art, for a grating-based MUX/DEMUX that can utilize anamorphic optical and beams to minimize device size while maintaining adequate resolving power. The present invention addresses such a need.

SUMMARY OF THE INVENTION

To address the above-mentioned need, an apparatus and a method for an improved grating multiplexer/de-multiplexer (MUX/DEMUX) apparatus are herein provided. In a first preferred embodiment, a MUX/DEMUX apparatus in accordance with the present invention comprises an optical fiber, a collimator optically coupled to the optical fiber, an anamorphic pair of prisms optically coupled to the collimator opposite to the optical fiber, a reflection grating optically coupled to the anamorphic pair of prisms at a side opposite to the collimator, a focusing lens optically coupled to the anamorphic pair of prisms at the same side of the prisms as the collimator and a plurality of optical input, output or throughput devices optically coupled to the focusing lens opposite to the anamorphic pair of prisms. In a second preferred embodiment, a MUX/DEMUX apparatus in accordance with the present invention comprises an optical fiber, a collimator optically coupled to the optical fiber, a first anamorphic pair of prisms optically coupled to the collimator opposite to the optical fiber, a transmission grating optically coupled to the first anamorphic pair of prisms at a side opposite to the collimator, a second anamorphic pair of prisms optically coupled to the transmission grating at a side opposite to the first anamorphic pair of prisms, a focusing lens optically coupled to the second anamorphic pair of prisms opposite to the grating and a plurality of optical input, output or throughput devices optically coupled to the focusing lens at a side opposite to the second anamorphic pair of prisms.

In operation of a MUX/DEMUX in accordance with the present invention as a de-multiplexer, a light comprising a composite optical signal received from the optical fiber is collimated into a beam with a circular cross section by the collimator and expanded substantially only along one dimension by an anamorphic pair of prisms. The resulting anamorphic light beam with elliptical cross section is then directed to the diffraction grating whereat it is separated, by diffraction, into its component channels. The separated, anamorphic light beams comprising the diffracted channels pass once again through an anamorphic pair of prisms whereat they are condensed in one dimension so as to produce circular cross section beams. The separated light beams are then focused to a plurality of respective focal points by the focusing lens. Each one of a plurality of optical output or throughput devices disposed at a respective focal point receives or processes the wavelength focused to said respective focal point. Operation of the same apparatus as a multiplexer occurs when a plurality of channels are input to the apparatus from optical input or throughput devices disposed at the locations of the respective focal points.

DETAILED DESCRIPTION

The present invention provides an improved grating multiplexer/de-multiplexer (MUX/DEMUX) for use within optical communications networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 3 in conjunction with the discussion below.

Figure 1:
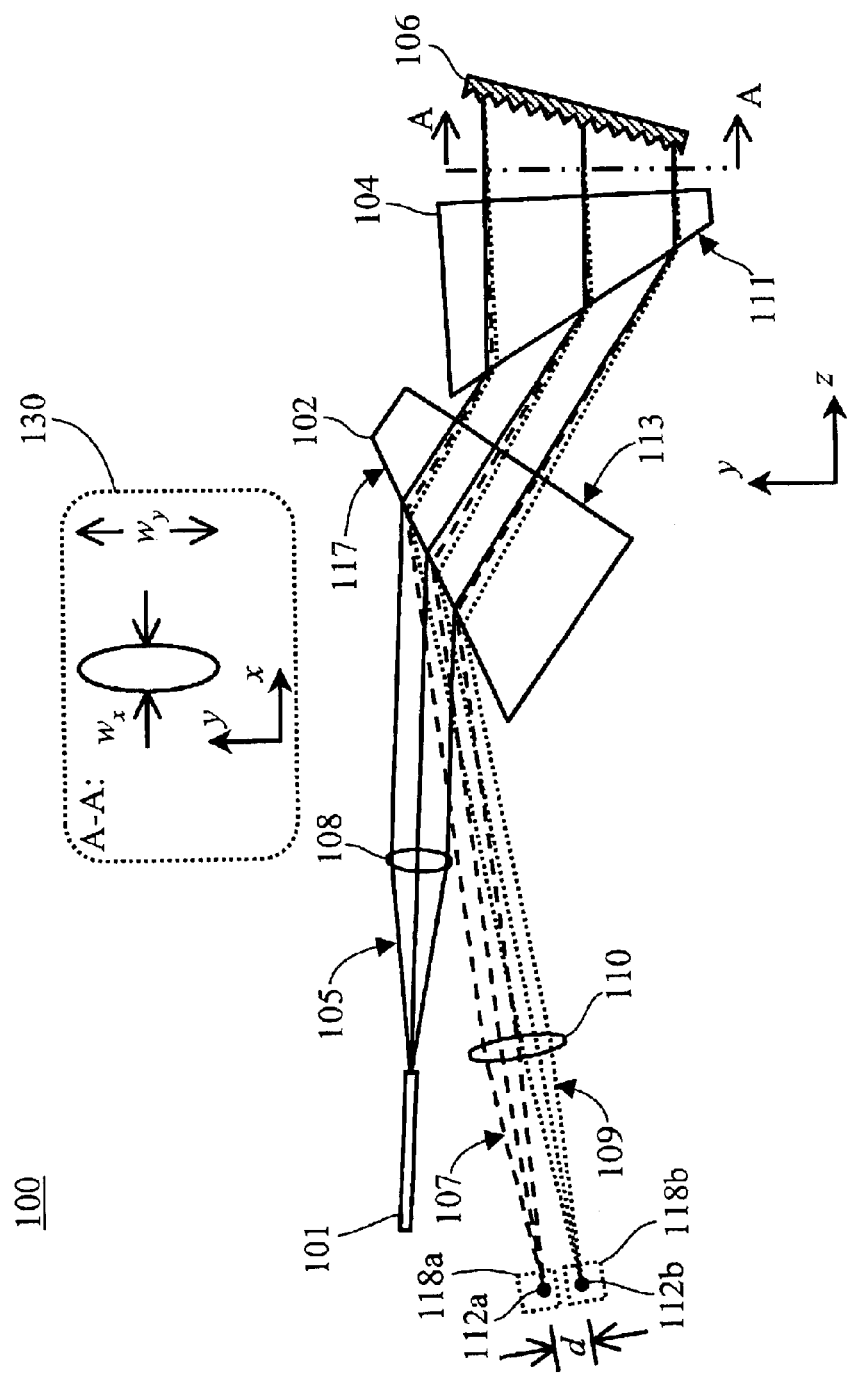
FIG. 1 illustrates a grating MUX/DEMUX in accordance with a first preferred embodiment of the present invention, wherein a reflection grating is utilized to separate channels.

FIG. 1 illustrates a MUX/DEMUX 100 in accordance with a first embodiment of the present invention. The MUX/DEMUX 100 comprises an anamorphic pair of prisms comprising a first prism 102 and a second prism 104. The anamorphic pair of prisms are optically coupled to a collimator (or collimator lens) 108 and to a focusing lens 110 at a first side and are optically coupled to a reflection-type diffraction grating 106 at a second side. The collimator 108 is further optically coupled to an optical fiber 101 at a side opposite to the anamorphic pair of prisms 102–104. It is assumed that FIG. 1 depicts a projection onto the y-z plane—that is, the plane parallel to both the y-axis and the z-axis, as indicated—and that the "grooves" or other diffraction-producing pattern of the diffraction grating 106 lie perpendicular to the plane of the paper and parallel to the x-axis. Thus, the grating 106 disperses light of different channels within the y-z plane.

In the discussion of the MUX/DEMUX 100 that follows, it is assumed that the apparatus 100 functions as a de-multiplexer. In operation as a de-multiplexer, light comprising a composite optical signal 105 is delivered to the MUX/DEMUX 100 from an optical fiber 101. The composite optical signal 105 comprises a plurality of n optical channels $\lambda_1$–$\lambda_n$. The light of composite optical signal 105 emanating from the optical fiber 101 is collimated by the collimator 108. In cross section, this light comprises a circular beam. This light of the composite optical signal 105 then passes through the anamorphic pair of prisms 102–104 from left to right, as drawn, whereby the circular beam from the collimator 108 is converted into an anamorphic beam.

Box 130 of FIG. 1 illustrates a cross section of the light of composite optical signal 105 in the cross section A—A after the light has passed through the pair of prisms 102–104. The width of the anamorphic beam in the y direction ($w_y$) is greater than its width in the x direction ($w_x$) because the pair of prisms 102–104 expands the beam only along the y dimension. The width $w_x$ is substantially equal to the diameter of the circular cross section of the light beam comprising composite optical signal 105 between the collimator 108 and the prism 102. The anamorphic beam of the light of the composite optical signal then passes to the reflection-type diffraction grating 106 at which its constituent channels are angularly and spatially dispersed by diffraction. Since the "grooves" or other patterning of the grating 106 run(s) parallel to the x dimension, the elliptical shape of the anamorphic beam permits the beam to cover a large number of grooves without utilizing a wide grating. A narrow grating can thus be utilized without any degradation in its resolving power.

The pathways of only two diffracted channels—a channel 107 comprising a relatively shorter wavelength $\lambda_i$ and another channel 109 comprising a relatively longer wavelength $\lambda_j$, wherein ($\lambda_j > \lambda_i$)—are shown in FIG. 1. Channel 107 is indicated by dashed lines whilst channel 109 is indicated by dotted lines. It is to be understood, however, that a plurality of channels having different wavelengths may also exist and that the light of each such channel will follow its own unique path after diffraction by the grating 106. After diffraction by the reflection grating 106, the lights of the channels 107–109 and any other channels pass back through the anamorphic prisms 102–104 from right to left, as drawn. The prisms 102–104 condense the cross sections of the beams comprising each channel in only one dimension such that, after passing through the prisms, these beams are once again circular. The circular cross section of the beams of channels 107–109 are similar in size to that of the beam 105 between the collimator 108 and the prism 102.

Because of the diffraction of the channels 107–109 by the grating 106 in combination with the subsequent refraction of these channels by the prisms 102–104, the channels 107–109 do not intercept the lens 108. Instead, the condensed beams of the channels 107–109 are focused by a single focusing lens 110 to two different focal points 112a–112b, respectively. The channel comprising the relatively shorter wavelength $\lambda_i$ is focused to point 112a whilst the channel comprising the relatively longer wavelength $\lambda_j$ is focused to point 112b. Other channels comprising other physical wavelengths will be focused to their own respective focal points lying, approximately, along a line joining the focal points 112a–112b. The condensation of the beams by the prisms 102–104 permits the focusing lens 110 to be much smaller in diameter than would be necessary if the diffracted light beams were not so condensed by the anamorphic pair of prisms 102–104 after the diffraction by grating 106.

The refraction by the prisms 102–104 not only condenses the beam size of the lights of channels 107–109 but also increases their angular separation relative to that provided by grating 106 alone. For instance, at the surface 111 of prism 104, the light of channel 107 intercepts this surface at a greater angle to its normal line than does the light of channel 109, and is therefore refracted "upwards" at surface 111 to a greater degree than is the light of channel 109. The channels 107–109 then pass into prism 102 through its surface 113 approximately along a normal line to this surface without appreciable refraction. Then, upon exiting prism 102 through its surface 117, the light of channel 109 intercepts this surface at a greater angle to its normal line than does the light of channel 107, and is therefore refracted "downwards" at surface 117 to a greater degree than is the light of channel 107. The combination of greater "upwards" refraction of channel 107 at surface 111 and greater "downwards" refraction of channel 109 at surface 117 leads to a greater angular separation between these channels after passing through the pair of prisms 102–104. This increased angular separation increases the separation distance d between the two focal points 112a–112b.

Separate output fibers (not shown) could be positioned with their ends disposed at focal point 112a and focal point 112b, respectively, so as to output the separated channels $\lambda_i$ and $\lambda_j$ along the separate respective fibers. Alternatively, other light receiving, conditioning or guiding components 118a–118b could be disposed at or centered upon the focal points 112a–112b, as well as at the focal points of other channels, so as to separately process the lights of the separated channels $\lambda_i$, $\lambda_j$, etc. For instance, the components 118a–118b may comprise separate light detectors disposed at the focal points 112a–112b so as to convert the optical signals carried by the separated channels $\lambda_i$ and $\lambda_j$ into respective electronic signals. In another example, the components 118a–118b may comprise different programmable liquid crystal elements disposed at the points 112a–112b so as to independently rotate respective light polarization directions of the channels. The channels might then be routed to a particular output port based upon their polarization.

If the MUX/DEMUX 100 is operated as a multiplexer, then lights of the wavelengths $\lambda_i$, and $\lambda_j$ are input to the apparatus 100 at the points 112a–112b, respectively, and the pathways followed by the channels are exactly opposite in sense from those just described above. Lights of other wavelengths may be input at their own respective points disposed approximately along a line containing points 112a–112b. For instance, in the multiplexing operation, the components 118a–118b may comprise different optical fibers emanating light of the wavelengths $\lambda_i$ and $\lambda_j$ and positioned with their end faces at the points 112a–112b respectively. Alternatively, the components 118a–118b may comprise different light sources, optical transmitters or optical guiding devices either emitting or emanating light at wavelengths $\lambda_i$ and $\lambda_j$ and positioned at the points 112a–112b. In either such case and in similar cases, the channels $\lambda_i$ and $\lambda_j$ follow the opposite paths to those described in the de-multiplexer operation. These channels, as well as any others, are combined, by diffraction at the grating 106, into the single composite optical signal 105 that is then output to the fiber 101.

Figure 2:
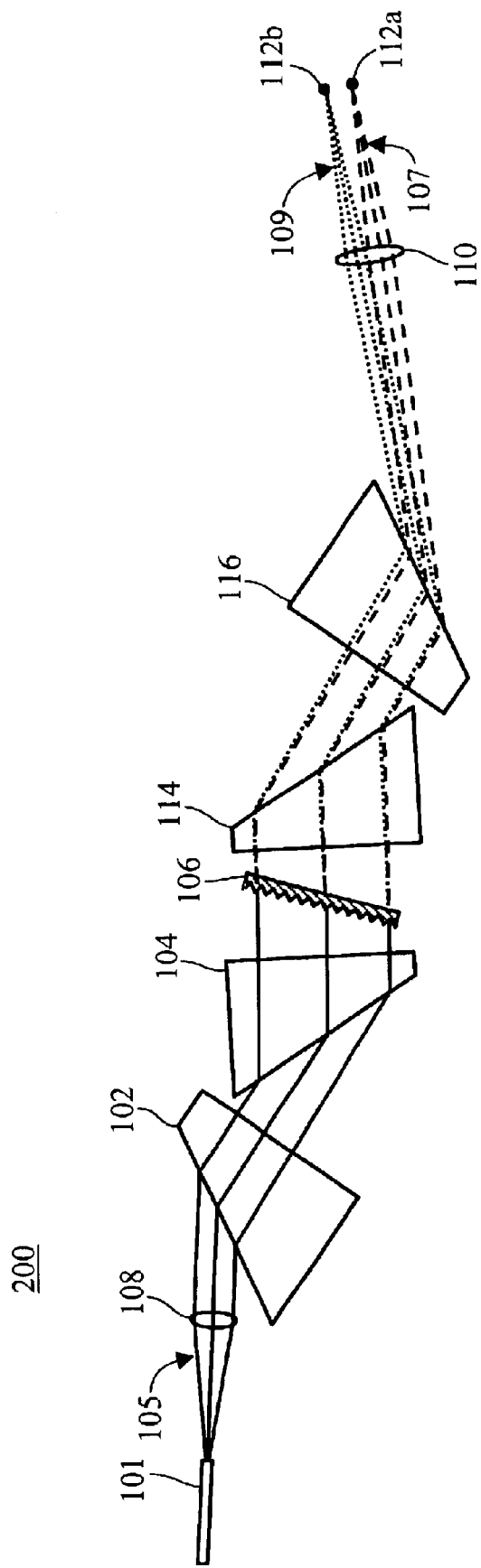
FIG. 2 illustrates a grating MUX/DEMUX in accordance with a second preferred embodiment of the present invention, wherein a transmission grating is utilized to separate channels.

FIG. 2 illustrates a MUX/DEMUX 200 in accordance with a second embodiment of the present invention. The MUX/DEMUX 200 (FIG. 2) comprises the same optical fiber 101, collimator 108 and prisms 102–104 as does the MUX/DEMUX 100 (FIG. 1) disposed similarly, relative to one another as in the apparatus 100. However, the grating 106 comprising the MUX/DEMUX 200 is a transmission-type grating instead of a reflection-type grating. Accordingly, the diffracted lights of the channels 107–109 emerge from the "back" side of the grating 106 opposite to the pair of prisms 102–104. A second anamorphic pair of prisms, comprising the prisms 114–116, is therefore optically coupled to this back side of the grating 106 to circularize and condense the anamorphic beams of the channels 107–109. The focusing lens 110, which focuses the light of channel 107 to focal point 112a and the light of channel 109 to point 112b, is optically coupled to the second anamorphic pair of prisms 114–116.

Figure 3:
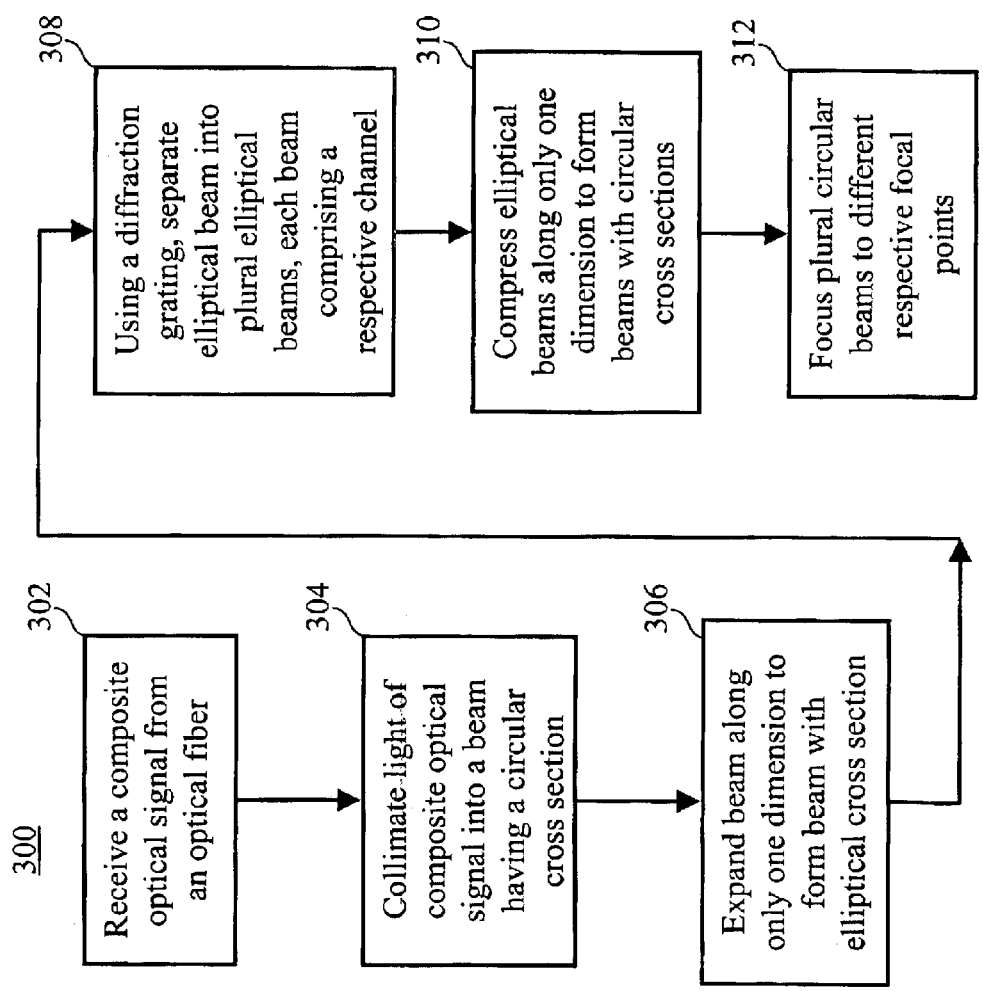
FIG. 3 depicts a method, according to the present invention, for de-multiplexing optical channels utilizing a diffraction grating.

FIG. 3 depicts a method 300, according to the present invention, for de-multiplexing optical channels utilizing a diffraction grating. The first step 302 of the method 300 comprises the reception of a composite optical signal from an optical fiber. The composite optical signal comprises a plurality of combined optical channels that are to be separated according to the method 300. The second step 304 of the method 300 is the collimation of the light of the composite optical signal received in step 302 into a beam with a circular cross-section. The step 302 will typically be performed with an optical collimator, such as collimator 108 of apparatus 100 (FIG. 1) and apparatus 200 (FIG. 2). The method 300 then proceeds to step 306 in which the beam with the circular cross-section is expanded along only one dimension so as to form a beam with an elliptical cross-section. Preferably, the step 306 is accomplished by transmitting the beam through an anamorphic pair of prisms, such as the pair of prisms 102—102 (FIGS. 1–2) but may also be performed by transmitting the beam through a pair of cylindrical lenses.

After the beam expansion, step 306, the method 300 proceeds to step 308 wherein a diffraction grating separates the beam with the elliptical cross-section into a plurality of sub-beams with elliptical cross-sections, wherein each sub-beam comprises a respective channel. The diffraction grating may comprise either a reflection-type grating as in apparatus 100 (FIG. 1) or a transmission-type grating as is utilized in apparatus 200 (FIG. 2). The method 300 then proceeds to step 310 wherein the sub-beams with the elliptical cross-sections are all compressed along only one dimension so as to form sub-beams with circular cross-sections. Preferably, the step 310 is accomplished by transmitting the sub-beams with the elliptical cross-sections through an anamorphic pair of prisms, such as prisms 102–104 in apparatus 100 (FIG. 1) or prisms 114–116 in apparatus 200 (FIG. 2). Step 310 may also be performed, however, by transmitting the beam through a pair of cylindrical lenses. Finally, the method 300 proceeds to the step 312, wherein the sub-beams with circular cross-sections are all focused to different respective focal points.

An apparatus and a method for an improved grating multiplexer/de-multiplexer has been disclosed. A grating multiplexer/de-multiplexer in accordance with the present invention comprises an optical fiber, a collimator optically coupled to the optical fiber, at least one anamorphic pair of prisms wherein one anamorphic pair of prisms is optically coupled to the collimator opposite to the optical fiber, a diffraction grating optically coupled to the at least one anamorphic pair of prisms, a focusing lens optically coupled to one anamorphic pair of prisms of the at least one anamorphic pair of prisms and a plurality of optical input, output or throughput devices optically coupled to the focusing lens. The at least one anamorphic pair of prisms permits the beam incident upon the diffraction grating to be relatively narrow in a dimension perpendicular to the dispersive direction of the grating so that the grating can produce high spectral resolution while preserving compact system size and simplicity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical multiplexing/demultiplexing apparatus, comprising:

an optical fiber;

a collimator optically coupled to the optical fiber for collimating an optical signal from the optical fiber into a beam having circular cross section;

at least one anamorphic pair of prisms optically coupled to the collimator at a side opposite to the optical fiber, wherein the at least one anamorphic pair of prisms is used to change the beam between the circular cross section and an elliptical cross section;

a diffraction grating optically coupled to the at least one anamorphic pair of prisms at a side opposite to the collimator;

a focusing lens optically coupled to the at least one anamorphic pair of prisms; and a plurality of optical devices optically coupled to the focusing lens at a side opposite to the at least one anamorphic pair of prisms.

2. The apparatus of claim 1, wherein the diffraction grating is a reflection-type diffraction grating.

3. The apparatus of claim 2, wherein the focusing lens is coupled to the at least one anamorphic pair of prisms at a same side as the collimator.

4. The apparatus of claim 1, wherein the diffraction grating is a transmission-type diffraction grating.

5. The apparatus of claim 4, wherein the at least one anamorphic pair of prisms comprises:

a first anamorphic pair of prisms optically coupled to the diffraction grating at a same side as the collimator; and a second anamorphic pair of prisms optically coupled to the diffraction grating at a side opposite to the first anamorphic pair of prisms.

6. The apparatus of claim 5, wherein the focusing lens is optically coupled to the second anamorphic pair of prisms at a side opposite to the diffraction grating.

7. The apparatus of claim 6, wherein the plurality of optical devices is optically couple to the focusing lens at a side opposite to the second anamorphic pair of prisms.

8. An optical multiplexing/demultiplexing apparatus, comprising:

an optical fiber for transmitting an optical signal;

a collimator optically coupled to the optical fiber for collimating the optical signal into a beam with a circular cross-section;

an anamorphic pair of prisms optically coupled to the collimator at a side opposite to the optical fiber for changing the beam between the circular cross-section and a elliptical cross-section;

a reflection-type diffraction grating optically coupled to the anamorphis pair of prisms at a side opposite to the collimator;

a focusing lens optically coupled to the anamorphic pair of prisms at a same side as the collimator; and a plurality of optical devices optically coupled to the focusing lens at a side opposite to the anamorphic pair of prisms.

9. An optical multiplexing/demultiplexing apparatus, comprising:

an optical fiber;

a collimator optically coupled to the optical fiber;

a first anamorphic pair of prisms optically coupled to the collimator at a side opposite to the optical fiber;

a transmission-type diffraction grating optically coupled to the first anamorphic pair of prisms at a side opposite to the collimator;

a second anamorphic pair of prisms optically coupled to the transmission-type diffraction grating at a side opposite to the first anamorphic pair of prisms;

a focusing lens optically coupled to the second anamorphic pair of prisms at a side opposite to the transmission-type diffraction grating; and a plurality of optical devices optically coupled to the focusing lens at a side opposite to the second anamorphic pair of prisms.

10. A method for de-multiplexing a composite optical signal, the composite optical signal comprising a plurality of optical channels, comprising the steps of:

(a) receiving the composite optical signal from an optical fiber;

(b) collimating a light of the composite optical signal into a beam with a circular cross-section;

(c) expanding the beam with the circular cross-section along only one dimension to form a beam with an elliptical cross-section;

(d) separating the beam with the elliptical cross-section into a plurality of sub-ions beams with elliptical cross-section utilizing a diffraction grating, wherein each sub-beam with elliptical cross-sections comprises a respective channel;

(e) compressing the plurality of sub-beams with elliptical cross-sections along only one dimension to form a plurality of sub-beams with circular cross-sections; and (f) focusing the plurality of sub-beams with circular cross-sections to different respective focal points.

* * * * *